United States Patent [19]
Van Gompel

[11] 3,994,521
[45] Nov. 30, 1976

[54] PORTABLE CABLE LOCK WITH BALL DETENTS

[75] Inventor: James Van Gompel, Fremont, Ind.

[73] Assignee: Brammall, Inc., Angola, Ind.

[22] Filed: Sept. 3, 1975

[21] Appl. No.: 610,062

[52] U.S. Cl. .............................. 292/319; 292/252; 24/136 A
[51] Int. Cl.² ........................................ B65D 55/06
[58] Field of Search ........... 292/252, 323, 319, 327, 292/318; 24/136 A

[56] References Cited
UNITED STATES PATENTS

| | | | |
|---|---|---|---|
| 848,879 | 4/1907 | Brown | 292/318 |
| 1,577,678 | 3/1926 | Behrman | 292/319 X |
| 2,469,592 | 5/1949 | Byer | 292/327 X |

*Primary Examiner*—Richard E. Moore
*Attorney, Agent, or Firm*—Hill, Gross, Simpson, Van Santen, Steadman, Chiara & Simpson

[57] ABSTRACT

A locking means for providing a seal comprising a locking shell formed with a central passageway which is internally tapered with an opening that changes from conical to triangular in shape and which carries spring loaded ball bearings and a retainer such that a cable can be inserted through the central opening in a first direction, thus, depressing the spring and allowing the balls to relieve pressure on the cable in said first direction but which provides substantial and locking pressure on the cable when the cable is placed under tension in the opposite direction. The cable may also be attached to a second fixed member such that a seal may be made by placing the locking case and the fixed member on the same cable.

8 Claims, 9 Drawing Figures

U.S. Patent  Nov. 30, 1976  3,994,521
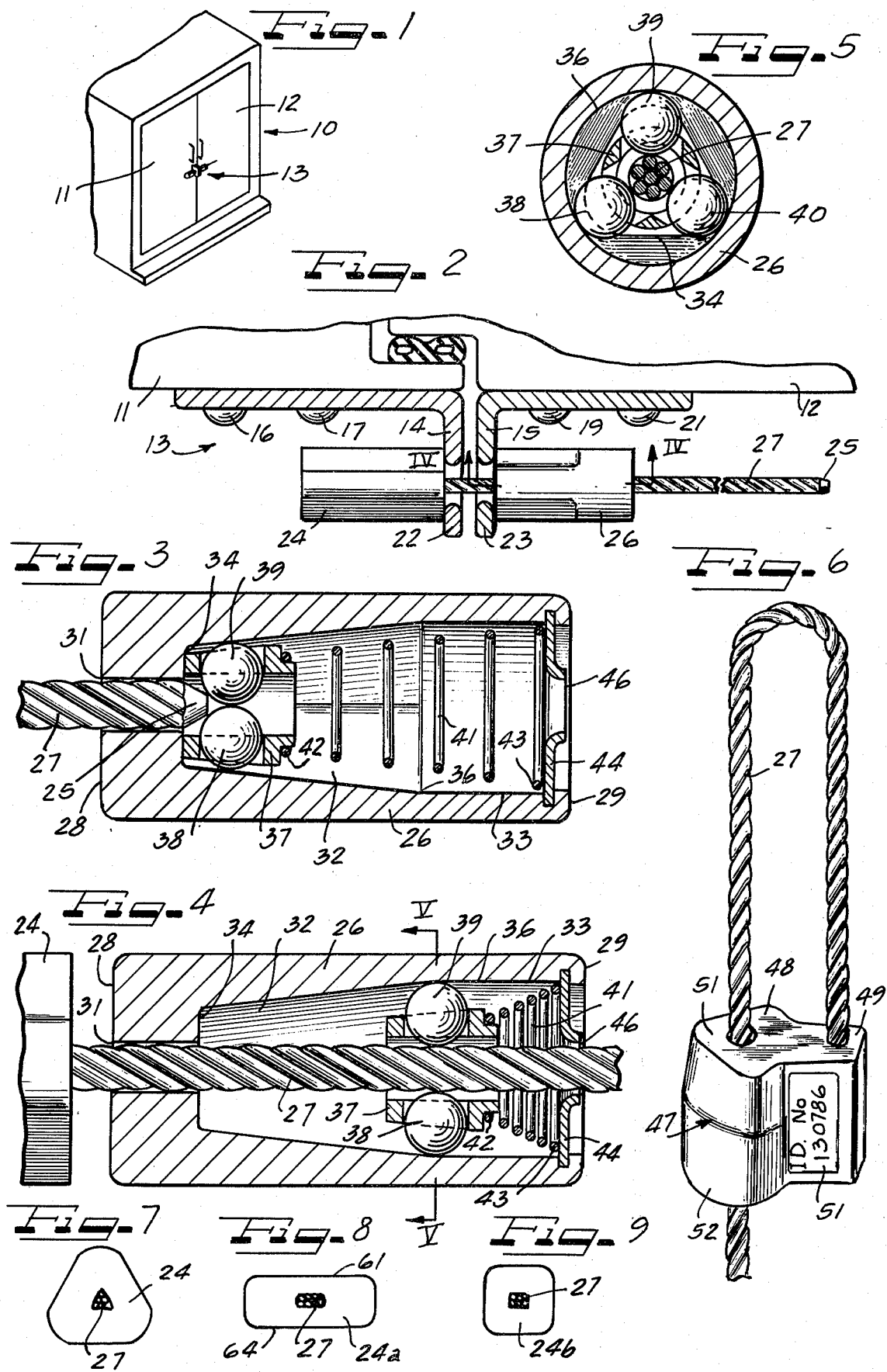

PORTABLE CABLE LOCK WITH BALL DETENTS

BACKGROUND OF THE INVENTION

1. Field of the Invention

This invention relates in general to locking means and in particular to locking means utilizing a line or cable.

2. Description of the Prior Art

My prior art U.S. Pat. No. 3,770,307 discloses a cable lock and seal device for a flexible cable and an enclsoure fixed secured to one end of the cable and with a passageway to receive the end of the cable therethrough and having a wedge element and disc-shaped jam element for locking the cable so that it can move freely in one direction but it is restricted from moving in the other direction.

SUMMARY OF THE INVENTION

The present invention relates to a locking means which is positive and which is used to represent what is commonly known as the "bolt" in conventional locks wherein in order to gain access into the locked parcel the bolt would have to be destroyed and also a lock is to be created that could not be "picked". The preset invention comprisies a locking shell through which a cable can be inserted and which has an internal tapered surface which goes from a round to triangular shape and which carries therein a cluster of balls mounted in a retainer which is spring tensioned in a first direction within the shell retainer. A cable can be inserted into the shell retainer so as to separate the balls and depress the spring thus allowing the balls to ride up the conical and triangular surface and separate allowing the cable to pass between the cluster of balls and out the other end of the shell retainer. When tension is applied to the cable to move it in the opposite direction out of the shell retainer, such tension causes the balls to move in the same direction as the tension on the cable, thus, forcing extreme pressure on the cable due to the conical and triangular shape of the internal surface of the shell retainer, thus, clamping and preventing the cable from being moved in the second direction relative to the shell. A second piece of the locking member comprises a body of material which is permanently crimped to the cable such that the locking case and the fixed member form a secure locking means.

The locking case can also be integrally formed with the fixed member such that the cable can be doubled back through the locking case.

Further objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which

BRIEF DESCRIPTION OF THE DRAWINGS

FIG. 1 is a perspective view of a locking device of the invention mounted on a pair of doors;

FIG. 2 is a side elevational view of the invention;

FIG. 3 is a sectional view taken on line 4—4 in FIG. 2;

FIG. 4 is a sectional view taken on line 4—4 in FIG. 2;

FIG. 5 is a sectional view taken on line 5—5 in FIG. 4;

FIG. 6 illustrates a modification of the invention wherein the locking case and fixed member are integrally formed;

FIG. 7 is an end view taken from FIG. 2 of the fixed device;

FIG. 8 is an end view of a modified fixed member, and

FIG. 9 is an end view of a further modified fixed member.

DESCRIPTION OF THE PREFERRED EMBODIMENTS

FIG. 1 illustrates the rear end of a truck 10 which has doors 11 and 12 which are secured by the locking device 13 of the invention. As shown in FIG. 2, the door 11 has an L-shaped member 14 attached thereto by screws or bolts 16 and 17 and the door 12 has an L-shaped member 15 attached thereto by bolts or nuts 19 and 21. The outer extending legs 22 and 23 are formed with openings through which the locking cable 27 of the invention extends. One end of the cable 27 is permanently attached to the fixed retaining means 24 and the free end of the cable is passed through the openings in portions 14 and 15 and the locking case 26 is passed over the end 25 of the cable 27 until it is against the portion 23. Since the locking case 26 can be freely moved in one direction relative to the cable which is to the left relative to FIG. 2 and which cannot be moved to the right relative to FIG. 2 due to its locking action a seal with a high degree of integrity is provided.

As shown in FIGS. 7, 8 and 9, the fixed member 24 is formed by crimping a block of aluminum having a central opening to the cable 27. The present member 24 comprises a substantial improvement over prior art members which are crimped onto a cable because with prior art devices the crimping is accomplished with crimping jaws that are circular or nearly circular in which case there is no real distortion of the cables original shape and the cable remains round. I have discovered that by using crimping shapes such as triangular, rectangular or square that substantially improved bonding between the cable 27 and the members 24 is accomplished. FIG. 7, for example, illustrates a fixed member 24 crimped in a triangular shape so that the central opening crimps the cable 27 into a triangular shape thus distorting the round shape of the cable causing each strand of the cable to have to find its own way out of the crimped object instead of following the path of the strand preceeding it. I have found that where a round crimp such as used in the prior art is utilized, that the path of each strand follows a definite spiral wherein it is stripped from the holding member whereas the path of each strand with a triangular, rectangular or square crimp such as illustrated in FIGS. 7, 8 and 9, respectively, are indefinite and do not follow any general pattern.

I have also discovered that starting with a round block of material with a central round opening which is crimped into a triangular shape such as shown in FIG. 7 that the center opening of the member 24 will be even more triangular than the external surface of the member 24.

I have also discovered that the bulky mass of the member 24 when made of aluminum, for example, is unaffected by the application of a burning flare or a propane torch due to the bulky cross-sectional area whereas with prior art seals having less bulk seals have been destroyed.

The generally flat-shape of the form shown in FIG. 8 utilizing a rectangular crimp provides two flat surfaces 61 and 64 upon which the seal number and other necessary or desirable imprinting can be placed.

The locking shell of the invention 26 is illustrated in sectional view in FIGS. 3 and 4 includes a generally cylindrical shell member 26 formed with a central opening 31 at a first end which opens into a larger opening 33 which extends to the end 29. The opening 31 at the end 28 of the shell is large enough to allow the end 25 of the cable to pass therethrough and a retainer member 44 formed with a central opening 46 is secured in the body member 26 adjacent the end 29 as shown. The internal space of the locking shell is formed with a cylindrical opening 33 and a tapered opening 32. The cylindrical opening 33 is adjacent the end 29 and the end retainer 44 and joins to a conical portion at a point 36 which passes into the tapered opening 32 to the end 34. As shown in FIG. 5, the conical tapered opening extends from point 36 and generally by transition goes into a triangular shaped opening before point 34.

A cluster of balls 38, 39 and 40 are held by a ball retainer 37 which has a central opening through which the balls extend and through which the cable 27 can extend. The retainer 37 is also formed with openings such that the balls 39 can engage the inner surface of the locking shell as shown in FIGS. 3, 4 and 5.

A coil spring 41 has a first end 43 which bears against the end plate 44 and a second end 42 which bears against the ball retainer 37 so as to bias it to the left relative to FIGS. 3 and 4.

The diameter of the cylindrical portion 33 of the internal opening of the locking shell is chosen such that when the cable 27 is inserted through the locking shell the balls will allow relatively free passage of the cable to the right as shown in FIG. 4. The tapered portion between points 36 and 34 of the internal opening 32 is such that upon the application of tension to the cable 27 to move the cable to the left relative to the shell 26 the balls 38, 39 and 40 will be cammed by the surface between the points 34 and 36 toward the center line of the cable 27 thus locking the cable so that it cannot be withdrawn by moving it to the left relative to FIG. 4.

In operation, the end 25 of the cable 27 is inserted through the opening 31 until it bears against the balls, 38, 39 and 40 and is further inserted into the locking shell and pushes the balls and the ball retainer 37 to the right relative to FIG. 3, thus, allowing the balls 38, 39 and 40 to move away from the cable until when the ball reach the point 36 illustrated in FIG. 4, the cable 27 can freely pass through the space between the balls and out the opening 46 of the retaining wall 44. As long as the cable is moved to the right relative to FIG. 4, the balls 38, 39 and 40 and the retainer 37 will remain in the position illustrated in FIG. 4, but any attempt to move the cable 27 to the left relative to FIG. 4 will immediately cause the balls 38, 39 and 40 to move on the internal conical and triangular shape surface between points 36 and 34 thus moving the balls together and applying pressure on the cable 27 so as to lock it for movement to the left relative to FIG. 4.

The shell 26 can be formed by deep drawing a sheet of flat stock or could be produced on a screw machine or a lathe from bar stock. It could also be cast or injection molded. The locking shell 26 and the fixed member 24 could be made of brass, aluminum, copper or steel. Cindered or powdered metal or nylon, delron or other plastics could also be used.

This lock can be applied in many applications wherever cinching, locking, suspending, connecting or taking up of a slack line is required.

Although three balls are illustrated in particular locking shells, it is to be realized that any number of balls such as 2, 3 or more could be used. The diameter of the balls would be chosen so as to be compatible with the size of the cable.

In one particular example utilizing cable having a 3/16 inch diameter, ¼ inch balls were used. I have found that three balls provides the best necking down of the cable effect.

In a particular model constructed I have found that a resistance for approximately 5 pounds pressure is required to insert the cable into the locking shell and this resistance is the result of the compression of the spring 41 coupled with the friction of the balls 38, 39 and 40 and the ball retainer 37 as well as the friction between the balls and the inside wall of the shell 26.

By pushing on the cable 27, the balls are forced to roll upwardly relative to FIG. 3 toward the larger end of the cone and outwardly from the axis of the cone until the cluster of balls is spread far enough to allow the cable to pass through the cluster. Further pushing of the cable 27 allows it to move out the shell retainer 26 until the fixed member 27 and the shell member 26 are both touching the hasp members 14 and 15 thus leaving no exposed cable and locking procedure has been completed.

I have discovered that when an attempt is made to remove the cable by pulling and twisting to the left relative to FIGS. 2 and 4 that by reshaping the internal surface 32 so that it goes from a cone at point 36 to a triangular shape at point 34 prevents the balls from rolling around the inner surface of the triangular shaped portion toward the end 34 which substantially prevents the cable from being twisted from the lock. This triangular portion adjacent the end 34 can be seen in the sectional view 5 wherein the conical portion 36 gradually goes into a triangular shape portion at 34.

A modification of the invention is illustrated in FIG. 6 wherein the retainer and shell member are integrally formed in a single unit 47. A portion 49 is generally square-shaped in cross-section as illustrated in FIG. 9 and is crimped to the cable 27. An enlarged portion 48 is generally triangular shaped and is formed with a conical and triangular shaped opening and is fairly similar to the shell member 26 illustrated in FIG. 2 with the exception that it has been permanently bonded to the member 49 or may be integrally formed with the member 49. A flat portion 51 allows the seal identification to be attached and in use the free end of the cable is passed through the locking means which might be a hasp and then into the end 51 of the portion 48 and out the end 52. The balls within the shell member 48 prevent the cable 27 from being drawn upward relative to FIG. 6 but it can be freely drawn downwardly until the desired length of the cable 27 extends between the surfaces 49 and 51.

It is seen that this invention provides new and novel locking means and although it has been described with respect to preferred embodiments it is not to be so limited as changes and modifications may be made which are within the full intended scope of the invention as defined by the appended claims.

I claim as my invention:

1. A locking means comprising,
a line,
a fixed member attached to said line,
a locking shell formed with a central opening and said line receivable therethrough,
said locking shell central opening formed with a first portion large enough to receive said line therethrough and an enlarged tapered second portion,
a ball retainer,
a plurality of balls held by said ball retainer in said second portion of said central opening and engageable with said line to allow it to pass freely through said locking shell in a first direction and to lock said line to prevent it from moving through said locking shell in a second direction opposite to said first direction,
spring biasing means engageable with said ball retainer to bias it in the second direction,
wherein said enlarged tapered second portion of said central opening is conical in shape at its largest dimension and makes a transition until it has walls which meet at angles at its smallest dimension, and
wherein said walls meet at acute angles.

2. A locking means according to claim 1 wherein there are three balls held by said ball retainer.

3. A locking means according to claim 1 including an end portion of said locking shell formed with an opening large engough for said line to freely pass therethrough and said spring biasing means comprising a coil spring mounted between said end portion and said ball retainer.

4. A locking means according to claim 1 wherein said fixed member and said locking shell are attached together side by side to form an integral unit.

5. A locking means according to claim 1 wherein said line is a metal stranded cable.

6. A locking means according to claim 5 wherein said fixed member has a central opening which is attached to said line by crimping it into a non-circular configuration.

7. A locking means comprising,
a line,
a fixed member attached to said line,
a locking shell formed with a central opening and said line receivable therethrough,
said locking shell central opening formed with a first portion large enough to receive said line therethrough and an enlarged tapered second portion,
a ball retainer,
a plurality of balls held by said ball retainer in said second portion of said central opening and engageable with said line to allow it to pass freely through said locking shell in a first direction and to lock said line to prevent it from moving through said locking shell in a second directon opposite to said first direction,
spring biasing means engageable with said ball retainer to bias it in the second direction,
wherein said enlarged tapered second portion of said central opening is conical in shape at its largest dimension and makes a transition until it has walls which meet at angles at its smallest dimension, and
wherein said walls meet at right angles.

8. A locking means according to claim 7 wherein there are four balls held by said ball retainer.

* * * * *

UNITED STATES PATENT AND TRADEMARK OFFICE
CERTIFICATE OF CORRECTION

PATENT NO. : 3,994,521
DATED : November 30, 1976
INVENTOR(S) : James Van Gompel

It is certified that error appears in the above-identified patent and that said Letters Patent are hereby corrected as shown below:

Column 1, line 26, "preset" should be --present--.

Column 3, line 51, "ball" should be --balls--.

Column 5, line 31, "engough" should be --enough--.

Column 6, line 23, "directon" should be --direction--.

Signed and Sealed this

Fifth Day of April 1977

[SEAL]

Attest:

RUTH C. MASON
Attesting Officer

C. MARSHALL DANN
Commissioner of Patents and Trademarks